June 17, 1969

A. D. KNIGHT ET AL 3,450,116

VAPOR CHARGING SYSTEM FOR INTERNAL COMBUSTION ENGINES

Filed Aug. 28, 1967

INVENTORS
ALTON D. KNIGHT &
EZRA C. EDDINS
BY
MARCUS L. BATES

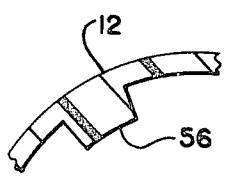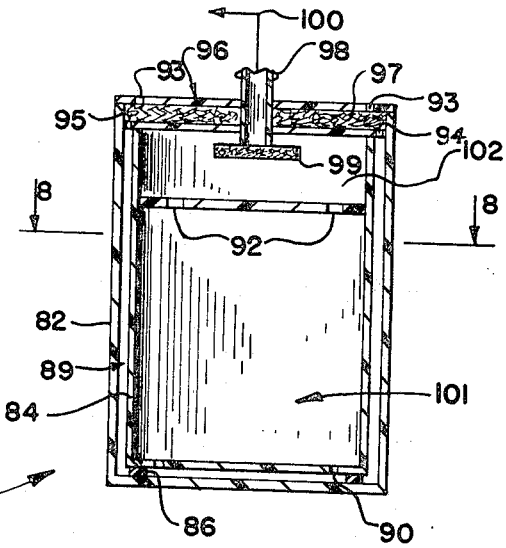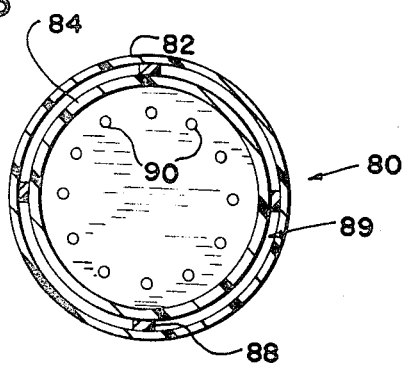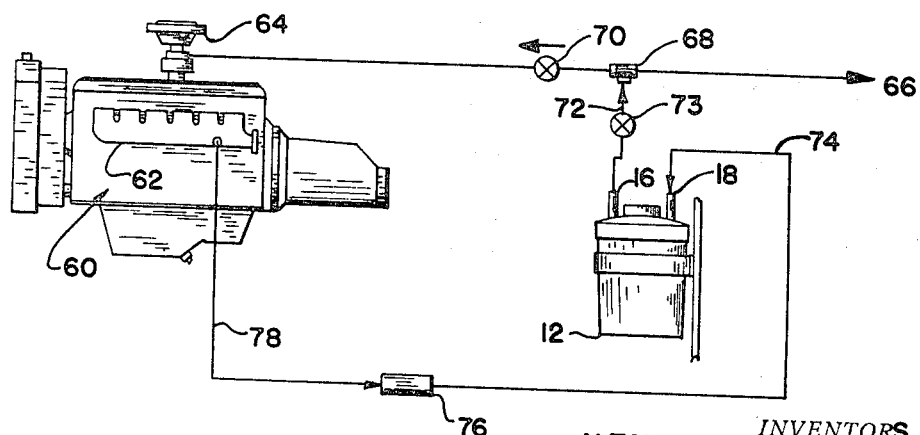

United States Patent Office 3,450,116
Patented June 17, 1969

3,450,116
VAPOR CHARGING SYSTEM FOR INTERNAL COMBUSTION ENGINES
Alton D. Knight, 2432 Idlewood Lane, and Ezra C. Eddins, 1614 W. 24th St., both of Odessa, Tex. 79760
Filed Aug. 28, 1967, Ser. No. 663,606
Int. Cl. F02m 21/06, 25/06
U.S. Cl. 123—119          9 Claims

ABSTRACT OF THE DISCLOSURE

A vapor charging system having a reservoir which contains chemical therein for supplying internal combustion engines with various vaporized chemicals. A gas diffusor is submerged below the liquid level of the chemical contained within the reservoir and connected to a gas inlet. An outlet in the form of a mist extractor is secured to the top of the reservoir with the outlet being attached to the intake manifold of the internal combustion engine. Flow of gas through the inlet and to the diffusor permits bubbles of air, or gas, to rise towards the mist extractor, whereupon chemically treated gas in the form of a vapor is allowed to flow into the manifold of the engine. The gas inlet is preferably connected to the exhaust manifold of the engine to thereby provide a closed system.

A modification of the device sets forth concentrically arranged containers, wherein the inlet is in the form of a filter. The containers cooperate to form an annular passageway therebetween, whereupon atmospheric air must flow through the filter, through the annular area between the containers, and through the chemical contained therewithin to thereby provide a gas diffusor. The modification further includes a removable filter which uncovers a convenient recharging means to thereby enable filling the apparatus by merely pouring the recharging chemical over the top of the device, whereupon the chemical flows into the reservoir along the same flow path provided by the gas inlet.

Background of the invention

Recently enacted state and federal laws directed to smog control has aroused interest in various expedients by which the exhaust system of internal combustion engines may be modified or treated with respect to smog producing chemicals emitted therefrom. Injection of various chemicals into the intake manifold of an internal combustion engine provides a cleaner burning explosion within the combustion chamber of the engine. For example, injection of water alone into the combustion chamber of an engine has long been recognized as an expedient for controlling the gaseous composition of the exhaust, as well as providing more efficient combustion and a cleaner running engine.

Summary

Injection of any chemical composition which attains significant reduction in incomplete combustion of the engine exhaust gases, or the elimination of undesirable products of combustion is contemplated by this invention, as well as any chemical which permits more efficient combustion, cleaner burning spark plugs, less gum formation, avoidance of sludge and sticking rings, better lubrication of the valve system, reduction in overheating tendencies of the engine, and better overall performance and economy of the engine. One chemical which provides many of these desirable characteristics is a mixture of the following: methyl alcohol, butyl Cellosolve, acetone, and Triton 100 (dye).

It is therefore an object of the present invention to provide an efficient vapor charging system for an internal combustion engine;

Another object of the present invention is the provision of a chemical charging reservoir along with apparatus associated therewith which efficiently vaporizes a chemical contained therein;

A still further object of the present invention is the provision of a vapor charging system which utilizes the reduced pressure of the intake manifold and the increased pressure of the exhaust manifold in order to provide a flow of gases through a vapor charging chamber;

A still further object of the present invention is the provision of a vapor charging system for an internal combustion engine which includes a novel chemical containing reservoir having a closure means thereon which forms a gas inlet, a filter, and a recharging aperture;

Still another object of this invention is the provision of a monocoque structure which forms a vapor charging reservoir, and which is able to withstand a reduction in internal pressure of one atmosphere;

The above objects are attained in accordance with the present invention by the provision of an apparatus which is fabricated in accordance with the above abstract.

Brief description of the drawings

FIGURE 6 is an enlarged fragmentary view showing part of the device seen in FIGURE 4;

FIGURE 7 is a cross-sectional view, similar in some respects to FIGURE 2, but showing a modification of the foregoing device;

FIGURE 8 is a cross-sectional view taken along line 8—8 of FIGURE 7; and

FIGURE 9 is a partly schematical, partly diagrammatical representation of the chemical charging system and showing one application of the present device as it may appear in conjunction with an internal combustion engine.

Description of the preferred embodiments

Figure 1:
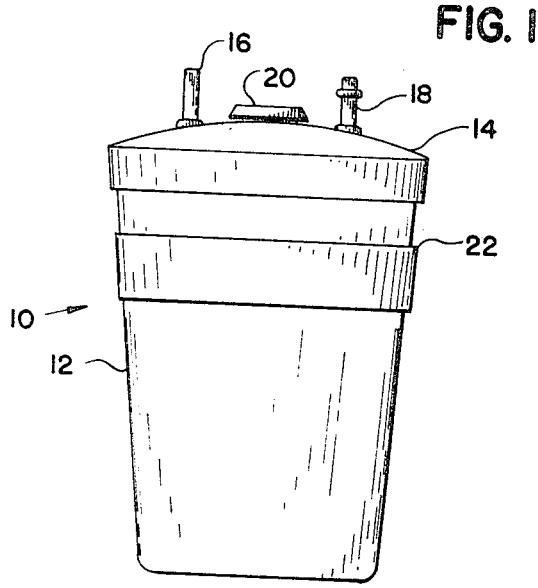
FIGURE 1 is an elevation showing a view of the assembled chemical charging chamber of the present invention.
Figure 2:
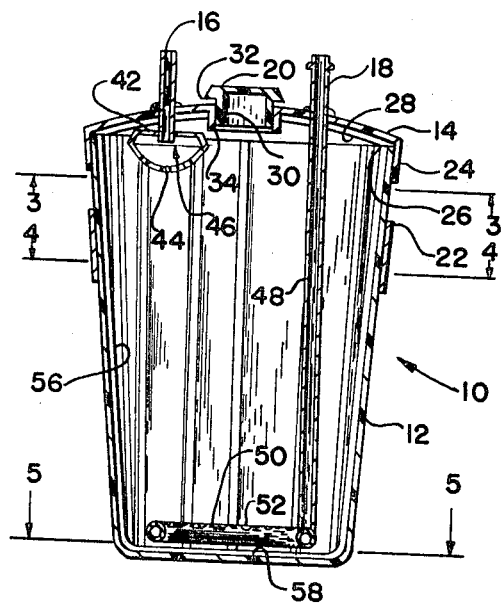
FIGURE 2 is a vertical cross-sectional view of the device seen in FIGURE 1, with additional parts being shown in order to better illustrate the invention.
Figure 3:
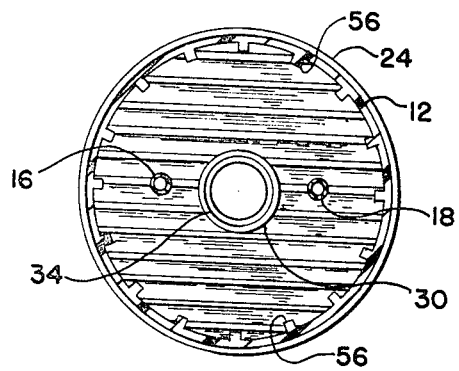
FIGURE 3 is a cross-sectional view, taken along line 3—3 of FIGURE 2, and looking in the direction as indicated by the arrows.

Looking now to the details of FIGURE 1, in conjunction with FIGURES 2 through 6 and FIGURE 9, there is seen illustrated therein a chemical charging chamber, generally illustrated by the arrow at numeral 10. The chamber includes a reservoir 12 having a closure member 14 thereon. The closure member includes a vapor outlet 16, a gas inlet 18, and a filling or recharging plug 20. A mounting strap 22, preferably a chrome-plated metal strap, circumferentially engages the upper portion of the reservoir for a major distance along the outer peripheral wall surface thereof. The closure means includes a downwardly depending circumferentially extending flange 24 which is tapered at the same angle (preferably 4° with respect to the vertical) as side wall 12. Between the dome shaped upper portion of the lid or closure member 14, and the circumferentially extending flange 24, there is provided a horizontally disposed face 26 which receives the upper extremity of the reservoir, with each face thereof mating in abutting relationship to provide a leak-proof interface. The lid is provided with a multiplicity of parallel arranged ribs 28 which increase the rigidity of the closure means.

The before mentioned filling plug includes a downwardly depending flange 30 which essentially describes a hollow tube and which is integrally attached to an outwardly depending flange 32 which overlies the dome-shaped lid. The downwardly depending flange is received in tight fitting relationship with respect to the tubular-like downwardly depending flange 34. The last named flange is an integral part of the lid.

Each depending end of the before mentioned mounting strap 22 is provided with an apertured right-angle bend which is adapted to receive a bolt 38 which is placed through the firewall 40 of a vehicle, or the like. Alternatively, the bolts may be used to attach the mounting straps to other structure located closely adjacent to the internal combustion engine, to which the device is to be flow connected.

A mist extractor having an upper horizontally disposed wall 42, and a bowl shaped apertured wall 44, defines an enclosure 46 which extracts entrained or unvaporized chemical from the vapors which otherwise may flow through the outlet 16.

Inlet 18 continues as a downwardly depending gas inlet pipe 48 which terminates in communication with a ring diffusor 50. The diffusor is provided with spaced apart upwardly disposed apertures 52 (preferably sixteen spaced apart upwardly depending apertures $\frac{1}{32}$ inch in diameter).

The reservoir is preferably fabricated into a monocoque structure by the provision of ribs 56 which are spaced apart equidistant and circumferentially disposed about the wall 12, with each rib continuing along to the bottom, where it then travels in a horizontal plane to define spaced apart intersecting ribs 58. Each rib then continues in a near vertical direction where it travels up the opposite side of the wall. Each rib is preferably tapered in the illustrated manner of FIGURE 6 to enhance extraction from the mold.

Looking now to the flow system of FIGURE 9, which is a partly schematical and partly diagrammatical representation of a novel manner illustrating one form by which the invention may be practiced in conjunction with an internal combustion engine. As seen in FIGURE 9, an internal combustion engine 60 having the usual exhaust manifold 62 and carburetor 64 associated therewith is provided with the vapor injection system seen in FIGURES 1 through 6. A flow conduit, generally illustrated by the arrow at numeral 66, is attached to the vacuum operated windshield wiper motor of the vehicle. A T fitting 68 is flow connected to one-way check valve 70, which in turn is flow connected to the low pressure area near the manifold and below the before mentioned carburetor. Conduit 72 interconnects the T-fitting to a needle valve 73, which in turn is flow connected to the outlet 16 located on the closure member of the reservoir 12. Gas inlet conduit 74 connects filter 76 to the before mentioned gas inlet 18. Metallic conduit 78, preferably a $\frac{3}{8}$ inch copper tube, is connected to the exhaust manifold 62.

Looking now to the details of FIGURES 7 and 8, wherein there is seen another embodiment of the invention, which is a modification of the before mentioned chemical charging chamber as set forth in FIGURES 1 through 6, wherein the chamber is generally illustrated by the arrow at numeral 80. This modification includes two concentrically arranged containers, 82 and 84, which are fabricated into a configuration whereby they may be slidably telescoped together in the illustrated manner. Lower mounting means 86 and upper mounting means 88 maintain each respective chamber properly aligned in spaced apart relationship with respect to each other to thereby leave a space in the form of an annulus 89 between the spaced apart walls, as well as a space between the bottom walls of each container, to thereby provide a flow path through the containers.

The bottom wall of the inner container is apertured as seen at numeral 90. Within the inner container there is provided a baffle plate having apertures 92 therein. An intake filter system includes an outer plate member having apertures 93 provided therein, and a lower plate member having apertures 94 arranged about the outer marginal edge portion thereof, with the last named apertures being aligned with the before mentioned annulus 89. The outer plate member therefore forms a removable filter, generally indicated by the arrow at numeral 96, which includes the filter material 97 which is attached thereto in any convenient manner. An outlet 98 includes a lower terminal end which is provided with a mist extractor 99. The outlet is flow connected to the intake manifold by means of conduit 100, with conduit 100 broadly corresponding to conduit 72 of FIGURE 9. As seen in FIGURE 7, the lower portion of the inner chamber generally illustrated by the arrow at numeral 101, provides a reservoir for containing liquid which is to be ingested by the internal combustion engine. The upper portion 102 of the inner container forms a separator to prevent entrained droplets of water entering the intake manifold along conduit 100.

Operation

Figure 5:
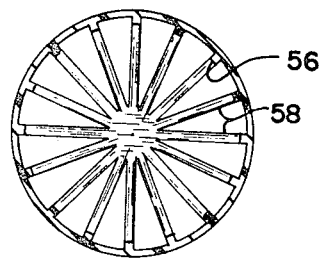
FIGURE 5 is a cross-sectional view of the device taken along line 5—5 of FIGURE 2.
Figure 4:
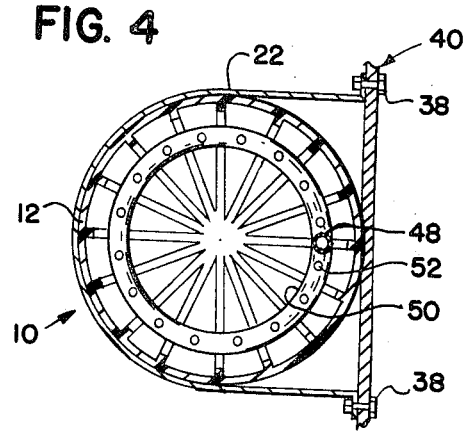
FIGURE 4 is a cross-sectional view of the device taken along line 4—4 of FIGURE 2.

In operation the mount strap 22 holding the chemical charging chamber is preferably mounted in a low temperature zone of the engine compartment, preferably adjacent to a firewall 40, in the illustrated manner of FIGURE 4. This expedient precludes overheating the plastic chamber. The closure member 14 may be removed, along with the mist extractor and the ring diffusor, by grasping the lower marginal edge portion of the tapered flange 24 and forcing the closure member from the reservoir by slightly deforming each member. Since the flange 24 is inwardly tapered in a downward direction an amount equal to the outward taper in an upward direction of the reservoir 12, the members are held locked together during normal operation. Furthermore, at certain manifold pressures, the internal pressure above the liquid level within the container may sometimes approach a differential in pressure equivalent to twenty-eight inches of mercury, or almost one atmosphere. Therefore it is necessary for the container to be reinforced a sufficient amount to withstand this pressure differential. This expedient is attained by providing the closure member with a multiplicity of spaced apart longitudinally extending ribs which prevent the dome shaped closure member from deforming inwardly. The side walls and bottom of the reservoir 12 are also provided with the spaced apart ribs which extend downwardly along the sides and then horizontally along the bottom where the ribs terminate in intersecting relationship at the central portion of the bottom of the reservoir in a manner as illustrated in FIGURES 4 and 5. Fabricating the chemical charging chamber in this manner provides a monocoque like structure which does not appreciably deform under one atmosphere of pressure differential.

Chemical is replaced within the reservoir 12 by removing the fill plug 20 from the aperture defined by the flange 34. Since the fill plug is provided with an outwardly directed flange 32, and since the vapor space within the charging chamber is generally under a vacuum, the plug 20 has an inwardly directed force exerted upon it, and therefore is positively sealed to the closure member. The reservoir is generally filled sufficiently to bring the liquid level near the lowermost portion of the mist extractor 42.

In operation, the outlet 16 is provided with a flow control valve in the form of a needle valve and connected to the intake manifold of an internal combustion engine, preferably by merely splicing into the windshield wiper vacuum line. While the vacuum line is illustrated as being connected to a low pressure area near the carburetor, it should be understood that the chemical charging chamber may be directly connected to the intake manifold, if desired.

The one-way check valve prevents damage to the charging container in the event of a "backfire" through the carburetor. The T 68, one-way check valve, and the needle valve are preferably assembled into an integral unit, and may be mounted by screws, or the like, upon any convenient surface within the engine compartment. The filter 76 is preferably connected to the exhaust manifold by means of a copper conduit 78 which will dissipate heat therefrom and accordingly eliminate overheating the plastic filter.

After properly filling the chemical reservoir of the charging chamber with the selected chemical, and with the engine running at average manifold pressure or speed, flow through the system occurs as follows: from exhaust manifold positive gas pressure flows along conduit 78, through filter 76, conduit 74, and into the inlet 18 of the chemical charging chamber. The flow continues through the gas inlet pipe 48, whereupon minute bubbles arise from the small apertures 52 contained within the ring diffusor. As the bubbles rise to the surface of the chemical contained within the reservoir 12 they become saturated with the surrounding liquid medium. The surface preferably is located approximately one to two inches below the lower extremity of the mist extractor. A vapor chamber is therefore provided between the closure member and the liquid level contained within the reservoir. Vapors from the vapor chamber enter the mist extractor through apertures 44, thereby providing a secondary chamber 46 which may be considered similar to a "knock-out" drum. The saturated gas, now called a vapor, flows through the outlet 16, through the flow control valve 73, and to the T by means of conduit 72. Since the T and one-way check valve are located in a low pressure line, flow continues into the intake manifold. While FIGURE 9 illustrates the check valve 70 being connected to a low pressure area of the carburetor 64, it should be understood that check valve 70 may alternatively be connected to any portion which is in communication with the intake manifold.

Looking now to the details of FIGURES 7 and 8, there is seen illustrated therein two spaced apart chambers, 82 and 84, which jointly provide a space in the form of an annular area 89 therebetween, as well as a space at the bottom thereof. The chambers are preferably cemented together by means of the illustrated spacers 86 to form a rigid structure. In order to fill the chemical receiving chamber 101 with fluid, the filter assembly 96 is removed from the remainder of the device, leaving the lower plate member bearing the apertures 94 therein rigidly attached to the outer and inner chambers. This enables chemical to be poured into the depression formed by the outer chamber and the before mentioned plate member. The liquid level is maintained below the illustrated baffle plate bearing apertures 92 therein.

In operation, flow occurs through apertures 93 located in plate member 95, through the filter medium 97, where foreign material is removed from the air, and through the apertures 94 located about the marginal edge portion of the lower plate member. Air continues to flow into annulus 89 and then into the bottom of the reservoir 101 through the apertures 90 located in the bottom of the inner chamber. The air is then dispersed as minute bubbles which rise to the surface of the liquid. The chemically treated vapor now flows into the vapor chamber 102 with the baffle plate preventing entrainment of large droplets. The vapor next flows through the mist extractor 99 whereupon smaller particles of liquid are removed from the vapor. The vapor is now free to flow along the conduit 100 to the intake manifold of the engine.

Where the chemical chamber 80 is employed in a closed circuit, as illustrated in FIGURE 9, the apertures 93 must be provided with a flow conduit which is connected to conduit 74.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

We claim:
1. A vapor charging apparatus for supplying the intake manifold of an internal combustion engine with vaporized chemical comprising:
 means forming an upwardly opening reservoir which is adapted to contain a treatment liquid therein;
 a closure means, an inlet, a gas diffusor, and an outlet;
 said closure means adapted to cover the top of said upwardly opening reservoir;
 said inlet and outlet being located in said closure means;
 said gas diffusor being located in the lower extremity of said reservoir and flow connected to said inlet;
 said outlet being located near the upper extremity of said reservoir and adapted to be connected to the intake manifold of the internal combustion engine;
 said reservoir having an outwardly tapered wall in an upward direction and an essentially horizontal bottom wall;
 spaced apart ribs circumferentially disposed about the inside peripheral wall surface of said reservoir with each rib extending horizontally across said bottom wall whereby said ribs intersect at the central portion of said bottom wall;
 said closure member having a circumferentially disposed downwardly and inwardly extending flange which cooperates with the upper depending end of said reservoir, said closure member being provided with a series of spaced apart ribs located on the inside peripheral surface thereof to thereby provide a monocoque structure which is resistant to deformation under reduced pressure; whereby:
 treatment chemical in the form of a liquid can be placed within said reservoir and a gaseous flow path established through said inlet to said diffusor, whereupon a vapor is formed near said outlet, with the vapor then flowing to the manifold.

2. The apparatus of claim 1 wherein said inlet is connected to the exhaust manifold of the engine to thereby provide a closed flow path for the vapor charging apparatus.

3. The apparatus of claim 1 wherein said inlet includes a vertically extending pipe flow connected to said diffusor, and said diffusor is in the form of a hollow tubular ring having apertures therein through which gas can flow; and a hollow apertured mist extractor located at the upper extremity of said reservoir and including means by which it is flow connected to said outlet.

4. A vapor charging apparatus for supplying internal combustion engines with vaporized chemical comprising:
 means forming a reservoir adapted to contain a liquid therein;
 a closure means, an inlet, a gas diffusor, and an outlet;
 a liquid refilling means associated with said closure means;
 said closure means adapted to cover the top of said reservoir;
 said inlet and outlet each being located in said closure means;
 said gas diffusor being located in the lower extremity of said reservoir and flow connected to said inlet;
 said outlet being located near the upper extremity of said reservoir and adapted to be connected to the intake manifold of an internal combustion engine;
 said reservoir includes an inner and an outer chamber; each said chamber being defined by side walls and a bottom;
 said chambers being telescoped together to form a flow path which includes an annular area formed between said side walls and further including a space formed between each said bottom;

means forming apertures in the innermost said bottom to thereby provide said diffusor;

an apertured lower plate member located at the upper extremity of said reservoir and having the apertures thereof in communication with said annular area; whereby a gas flow path is formed through said apertures of said lower plate member, through said annular area, through said space between said bottoms, and through said diffusor; and treatment chemical in the form of a liquid can be placed within said reservoir and a gaseous flow path established through said inlet to said diffusor, whereupon a vapor is formed near said outlet, with the vapor then flowing to the manifold of the engine.

5. The apparatus of claim 4 wherein said inlet is connected to the exhaust manifold of the engine to thereby provide a closed flow path for the vapor charging apparatus.

6. The apparatus of claim 4 wherein said closure means includes a filter and a removable apertured outer plate member;

said filter and removable outer plate member being superimposed upon said lower plate member in sandwiched relationship to thereby provide a filling plug in the form of a removable filter.

7. A vapor charging apparatus for supplying the combustion chambers of internal combustion engines with vaporized chemcal comprising:

means forming a reservoir adapted to contain a liquid therein;

a closure means, an inlet, a gas diffusor, and an outlet; a liquid refilling means associated with said closure means;

said closure means adapted to sealingly cover the top of said reservoir;

said inlet and outlet being located in said closure means;

said gas diffusor being located in the lower extremity of said reservoir and flow connected to said inlet;

said outlet being located near the upper extremity of said reservoir and adapted to be connected to the intake manifold of an internal combustion engine;

said reservoir includes an upwardly opening inner container defined by side walls and a bottom wall;

an outer container surrounding said inner container with said outer container having a side wall and a bottom wall, with the last said side and bottom walls cooperating with said inner container to form a flow path between said inner and outer walls, respectively, and between the inner and outer bottoms respectively, of said inner and outer containers;

said bottom of said inner container receiving apertures therein to provide for the recited diffusor;

said closure means being in the form of an inner plate member, with said inner plate member securing said inner and outer containers together;

said inlet being in the form of spaced apart apertures located in said plate member with said apertures being in flow communication with the area formed by the spaced apart container walls;

whereby: chemical in the form of a liquid can be placed within said reservoir and a gaseous flow path established through said inlet to said diffusor, whereupon a vapor is formed near said outlet, with the vapor then flowing to the manifold of the engine.

8. The apparatus of claim 7 wherein said inlet is connected to the exhaust manifold of the engine to thereby provide a closed flow path for the vapor charging apparatus.

9. The apparatus of claim 7 wherein said closure member includes a filter and a removable apertured outer plate member;

said filter and removable outer plate member being superimposed upon said lower plate member in sandwiched relationship to thereby provide a filling plug in the form of a removable filter.

References Cited

UNITED STATES PATENTS

| | | | |
|---|---|---|---|
| 1,529,351 | 3/1925 | Grooms. | |
| 1,594,616 | 8/1926 | Heffernan. | |
| 2,300,774 | 11/1942 | Cartmell | 123—25 |
| 2,430,852 | 11/1947 | Allen. | |
| 3,139,873 | 7/1964 | Gardner. | |

FOREIGN PATENTS

| | | |
|---|---|---|
| 238,732 | 11/1945 | Switzerland. |
| 882,518 | 3/1943 | France. |

WENDELL E. BURNS, *Primary Examiner.*

U.S. Cl. X.R.

123—25, 198; 55—256